United States Patent [19]

Mizote

[11] 4,307,452
[45] Dec. 22, 1981

[54] FUEL CONSUMPTION MEASURING APPARATUS

[75] Inventor: Masanori Mizote, Yokosuka, Japan

[73] Assignee: Nissan Motor Company, Limited, Yokohama, Japan

[21] Appl. No.: 80,318

[22] Filed: Oct. 1, 1979

[30] Foreign Application Priority Data

Oct. 30, 1978 [JP] Japan ............................ 53-132582

[51] Int. Cl.³ .......................... G06F 7/38; F02B 3/00
[52] U.S. Cl. .................................. 364/442; 73/113; 123/487; 235/92 PE
[58] Field of Search ...................... 364/431, 442, 509; 123/32 EA, 32 EF, 32 EC, 487; 235/92 CT, 92 PE; 73/114, 113

[56] References Cited

U.S. PATENT DOCUMENTS

| | | |
|---|---|---|
| 3,812,710 | 5/1974 | Bauman et al. |
| 3,895,611 | 7/1975 | Endo et al. ................. 123/32 EA |
| 3,914,580 | 10/1975 | Watson et al. ................ 235/92 CT |
| 3,991,727 | 11/1976 | Kawai et al. ................. 364/431 |
| 4,012,948 | 3/1977 | Kuno . |
| 4,073,270 | 2/1978 | Endo ....................... 364/431 |
| 4,133,323 | 1/1979 | Adler ...................... 123/32 EA |
| 4,134,367 | 1/1979 | Ferry et al. ................ 123/32 EA |
| 4,140,083 | 2/1979 | Frobenius .................. 364/431 |
| 4,140,087 | 2/1979 | Daumer et al. ............... 364/431 |
| 4,143,622 | 3/1979 | Klötzner et al. ............. 123/32 EC |

FOREIGN PATENT DOCUMENTS

2034067 7/1970 Fed. Rep. of Germany .

OTHER PUBLICATIONS

Williams; "Electronic Fuel Injection Reduces Automotive Pollution"; *Electronics*; vol. 45; No. 19; 09/11/72.

*Primary Examiner*—Errol A. Krass
*Attorney, Agent, or Firm*—Lane, Aitken, Kice & Kananen

[57] ABSTRACT

A fuel consumption measuring apparatus for an internal combustion engine equipped with an electromagnetic fuel injection valve, comprising a fuel injection control means which calculates a proper value of fuel to be injected into the engine, and which then corrects this value in accordance with the characteristics of the electromagnetic fuel injection valve and controls the valve thereby, and a totalling means, which, in synchronization with the signals for controlling the valve, totals the values of the amount of fuel to be injected. In an embodiment, the totalling means is capable of subtracting a first predetermined value from the total held therein, and the apparatus further comprises a decision means which at regular time intervals judges whether the totalled value in the totalling means is greater than a second predetermined value or not; and, if it is, outputs an output pulse signal and also controls the totalling means to cause it to perform the subtraction.

5 Claims, 6 Drawing Figures

FUEL CONSUMPTION MEASURING APPARATUS

BACKGROUND OF THE INVENTION

The present invention relates to a fuel consumption measuring apparatus for use with internal combustion engines which are fitted with electronic fuel injection, and more particularly relates to such an apparatus which is adapted to be fitted to an automobile.

Heretofore, it has been usual to measure the amount of fuel consumed by a vehicle by a fuel flow sensor provided in the fuel supply system.

Recently, fuel injection in vehicles has become common. In such vehicles, a new way of measuring fuel consumption has been proposed and practiced, as shown in FIG. 1 of the accompanying drawings as a block diagram. The electronically controlled fuel injection device shown herein comprises a detector 1 which detects intake air flow of the engine, detectors which are not shown and which detect other operating parameters of the vehicle, an arithmetic circuit 2 which calculates the proper amount or ideal amount of fuel to be injected into the engine—for example, in order to obtain a predetermined air/fuel ratio—and whose output is fed to a driving circuit 3, which changes it into a fuel injection control signal synchronized with the revolution of the engine, and corrected, and an electromagnetic fuel injection valve 4 which is operated by the fuel injection control signal.

The amount of fuel actually injected by the fuel injection valve 4 is not actually equal to the amount of fuel which is indicated by the control signal from the driving circuit 3 as proper to be input, because of operational time delay of the valve 4, and other sources of error therein. However, these various sources of error are measured in advance, and the driving circuit 3 is so constituted as to correct the fuel amount signals fed to it from the arithmetic circuit 2, so as to allow for these sources of error. In other words, the signal 2a from the arithmetic circuit 2 indicates the amount of fuel to be ideally supplied to the engine, and this is adjusted in the driving circuit 3 so as to counteract the errors which will be introduced in the operation of the fuel injection valve 4. Thus the signal 3a output from the driving circuit 3 to the fuel injection valve 4 does not directly indicate the exact amount of fuel to be injected, but rather is such as to cause the injection of the correct amount of fuel, bearing in mind the particular characteristics of the fuel injection valve 4.

The prior art fuel consumption system has comprised passing the fuel injection valve control signal 3a into a counting or totalling circuit 5 and measuring therein the amount of fuel consumed, outputting the result to a signal processing circuit 6 which calculates such data, for example, as the ongoing fuel consumption per kilometer therefrom, and which displays the result on a display unit 7. However, because the signal 3a does not directly represent the amount of fuel injected by the fuel injection valve 4, as explained above, because it has been corrected by the driving circuit 3 in anticipation of errors which will be introduced by the operation of the fuel injection valve 4, it is necessary first to pass this signal 3a through a correction circuit 8, before inputting it to the totalling circuit 5. This correction circuit 8, effectively, undoes the correction work done by the driving circuit 3, and restores the value denoted thereby to the value denoted by the signal 2a as the ideal amount of fuel to be supplied to the engine.

This correction and recorrection introduce error, clearly, and the circuit construction is rather complicated.

SUMMARY OF THE INVENTION

Therefore, it is an object of the present invention to provide a fuel consumption measuring apparatus for use with an internal combustion engine, of a simple construction, which is accurate.

Another object of the present invention is to provide a fuel consumption measuring apparatus for use with a vehicle which is equipped with electronic fuel injection.

According to the present invention, there is provided, in an internal combustion engine equipped with an electromagnetic fuel injection valve, a fuel consumption measuring apparatus, comprising: a fuel injection control means, which calculates a fuel amount signal corresponding to the amount of fuel to be injected into the engine, and which derives a fuel injection valve control signal, based on this fuel amount signal, and corrected according to the characteristics of the fuel injection valve, and controls the fuel injection valve thereby; and a totalling means, which totals values of the fuel amount signal in synchronization with the fuel injection valve control signal.

Further, according to a particular feature of the present invention, the totalling means may output a pulse signal whenever the totalled value rises above a predetermined value.

Yet further, according to a particular feature of the present invention, the totalling means is capable of subtracting a first predetermined value from the totalled value therein, and the apparatus further comprises a decision means which at regular time intervals judges whether the totalled value in the totalling means is greater than a second predetermined value or not; and, if it is, outputs an output pulse signal, and also controls the totalling means to cause it to perform the said subtraction.

BRIEF DESCRIPTION OF THE DRAWINGS

The present invention will become more clearly understood from the following descriptions of two preferred embodiments thereof, and from the accompanying drawings. It should be clearly understood, however, that the descriptions of the embodiments, and the drawings, are given for the purposes of illustration and exemplification only, and are not intended to limit the present invention in any way; the scope of the present invention, and the protection sought to be granted by Letters Patent, are to be determined solely by the accompanying claims. In the drawings, like numerals refer to like parts, and:

DESCRIPTION OF THE PREFERRED EMBODIMENTS

Figure 2:
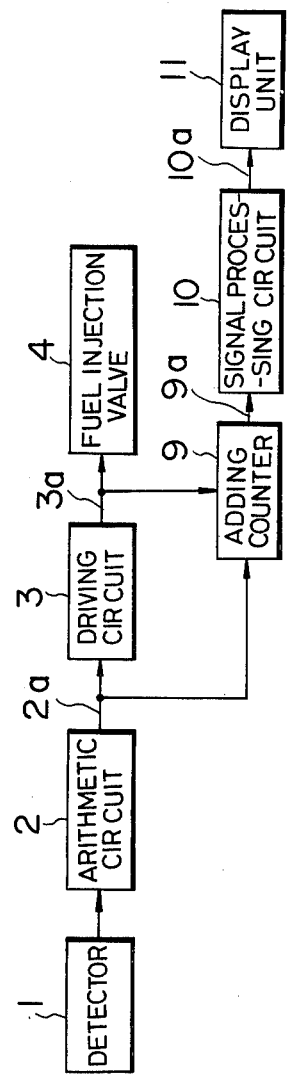
FIG. 2 is a block diagram showing a first embodiment of the present invention.

Referring to FIG. 2, there is shown a block diagram of a first embodiment of the present invention. In this and the other figures, block diagrams only are set forth, because the internal constitution of the circuits which are shown thereby will be a matter of course for a person of ordinary skill in the art, based on the explanation of the functions of the blocks, in the present disclosure.

Figure 1:
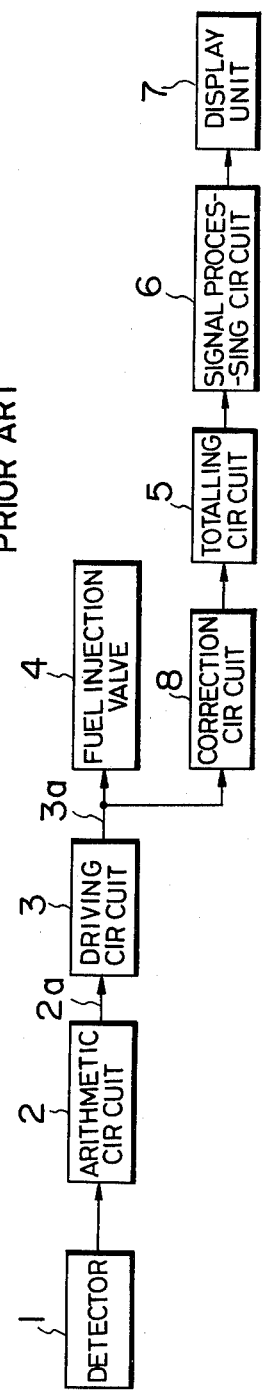
FIG. 1 is a block diagram showing a prior art fuel consumption measuring system, as applied to an engine which incorporates electronic fuel injection.

Reference numerals 1 through 4 show circuits which correspond to those shown and explained with regard to FIG. 1, and therefore explanation will be omitted. Reference numeral 9 designates an adding counter, which, in synchronism with the fuel injection pulse signal 3a, adds onto a total retained internally the current value of the output 2a of the arithmetic circuit 2, and, when the total exceeds a predetermined value, for example, the capacity of the counter, outputs a pulse signal 9a and reduces the total by a fixed value. Thus, for example, if the capacity of the counter is at minimum 0, and at maximum 255, ($=2^8-1$), then when in synchronization with a pulse signal 3a the total retained in the counter should become greater than 255, in fact the value of the total becomes that value less 256, and a pulse signal indicating overflow, 9a, is output. Thereby an output pulse 9a is produced every time a certain fixed amount of fuel is consumed, and is sent to the signal processing circuit 10.

This signal processing circuit 10 processes these pulse signals in some way, and outputs display information 10a for display by the digital display unit 11. Thus the digital display unit 11 is caused to indicate the fuel consumption data to the driver.

The actual construction of the signal processing circuit 10 can be chosen according to the kind of data to be displayed on the digital display unit 11. For indicating total amount of fuel consumed, the signal processing unit 10 may comprise a counter which sums the total number of pulses 9a and displays the result on the digital display unit 11. If it is desired to display the amount of fuel consumed during a predetermined interval during running of the automobile, this counter may be provided with a reset circuit and a switch or timer. If it is desired to display the amount of fuel currently being consumed per unit distance covered by the automobile, the signal processing circuit 10 may be provided with a signal indicating the distance covered moment by moment, and may be provided with an arithmetic facility for calculating the ongoing fuel consumption. Other possibilities can be envisaged, and they all are to be considered as within the scope of the present invention.

Thus, to explain in detail the operation of this embodiment, when the automobile is operating, the arithmetic circuit 2 calculates, moment by moment, the appropriate amount of fuel to be injected into the cylinders, corresponding to the amount of intake air detected by the air flow sensor 1, and other operating parameters of the engine, and outputs this calculated value 2a, which, to repeat, represents the ideal amount of fuel to be injected. In the driving circuit 3, this is used to produce a command signal 3a to the electromagnetic fuel injection valve 4, by correcting it according to the delay characteristics, etc., of this valve 4. Then the valve 4 is controlled thereby to inject fuel into the engine. Meanwhile, the adding counter 9 adds up, in synchronization with these fuel injection pulses 3a, the ongoing values of the ideal amount of fuel to be injected, 2a, and, every time the total value passes a predetermined value, outputs an output pulse 9a and reduces the total value by another predetermined value. These output pulses 9a are processed by the signal processing unit 10 to calculate data to be displayed by the digital display unit 11.

It is readily seen that, by contrast to the above described prior art, the operation of this system is more simple, because no correction circuit such as 8 is involved, and the actual amounts of fuel to be injected are totalled, instant by instant, as calculated as outputs 2a of the arithmetic circuit 2. This totalling is performed in synchronization with the actual times of fuel injection as determined by the actual fuel injection signals 3a. Therefore, the construction of this fuel consumption measuring device is simpler than in the prior art, and also the source of error inherent in the operation of the prior art device, by correction of the amount of fuel to be injected in the driving circuit 3, and then recorrection of this amount back into the original amount in the correction circuit 8, is effectively avoided. Thus the present invention will provide a greater accuracy.

Figure 3:
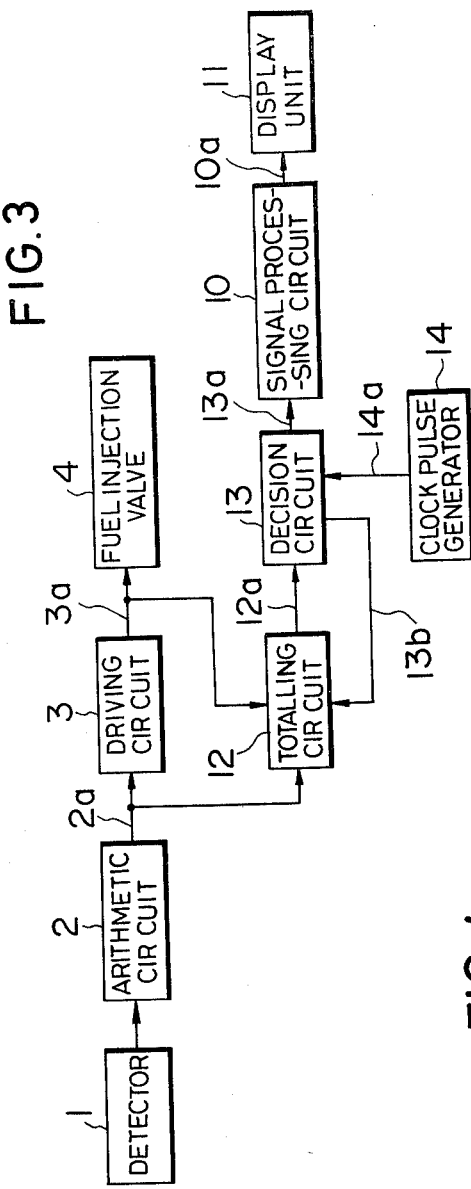
FIG. 3 is a block diagram showing a second embodiment of the present invention.

FIG. 3 is a block diagram showing a second embodiment of the present invention.

The reference numeral 12 denotes a circuit which totals the values 2a of the ideal amount of fuel for injection, in synchronism with the fuel injection pulse signal 3a, as before. However, in this embodiment, the decision circuit 13 determines, in synchronism with the clock pulses produced by the clock pulse generator 14, whether the total value in the circuit 12 is greater than a first predetermined value; and, it it is, this decision circuit 13 outputs a pulse signal 13a, and also a command signal 13b which is a command to the circuit 12 to subtract a second predetermined value from the total counted value.

The clock pulse generator 14 produces clock pulses at a constant frequency.

Figure 4:
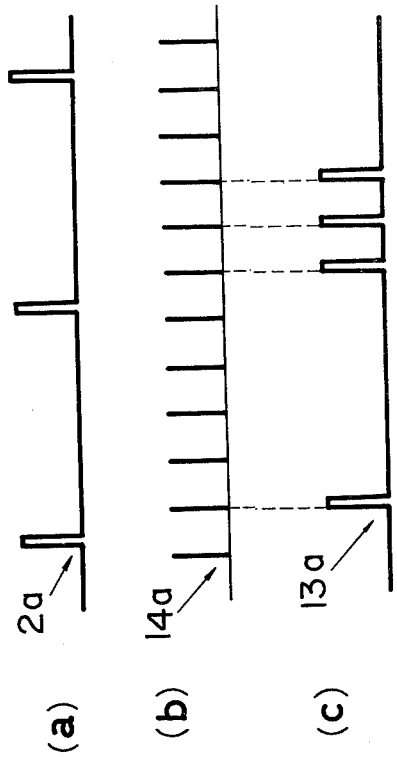
FIG. 4, which comprises FIGS. 4(a), (b), (c), is a time chart, showing outputs of the arithmetic circuit, the clock pulse generator, and the decision circuit of the embodiment illustrated in FIG. 3.

In operation of this fuel consumption measuring apparatus, the arithmetic circuit calculates an ideal amount of fuel to be injected, according to the air flow detected by the air flow sensor 1, and other parameters of the operation of the engine, and outputs a signal with a time interval which corresponds to this calculated value, as shown in FIG. 4(a). In synchronism with the actual times of fuel injection, as determined by the fuel injection signals 3a produced by the driving circuit 3 which controls the electromagnetic fuel injection valve 4 as before, these values of amount of fuel to be injected are totalled in the circuit 12. Further, this totalled value is checked by the decision circuit 13, in synchronization with the clock pulses shown in 4(b) output from the clock pulse generator 14, and when the totalled value is above the first predetermine value the decision circuit 13 outputs a pulse signal 13b, as shown in FIG. 4(c), ordering the circuit 12 to reduce this totalled value by a certain second predetermined value. Further, at this time the decision circuit 13 also outputs a pulse signal 13a to the signal processing unit 10. If the subtraction of this second predetermined value from the totalled value in the circuit 12 does not bring the totalled value below the first predetermined value, then, on the next clock pulse, again another pulse signal 13b and its associated pulse signal 13a are output. This procedure repeats until the totalled value in the circuit 12 is less than the first predetermined value.

Thus, it is to be noted that with high frequency clock pulses more accurate information can be obtained.

For example, assume that the first and second predetermined values are both 1.0 ml. Suppose that at a particular time the totalled value is 0.5 ml, and the current amount of fuel injection calculated in the arithmetic circuit 2 is 0.7 ml. When the signal shown in FIG. 4(a) is output, the totalled value in the circuit 12 becomes 1.2 ml, and exceeds the first predetermined value. Therefore, on the next clock pulse, the decision circuit 13 outputs one pulse 13a, and also outputs a pulse 13b which commands the circuit 12 to subtract the second predetermined value from the totalled value. Thus 1.0 is subtracted from the totalled value, 1.2, to give the new totalled value 0.2. This is below the first predetermined value (which is 1.0) and therefore, on the next clock pulse, the decision circuit 13 does not output any pulses.

Suppose now that the vehicle fuel injection amount is increased, so that the amount of fuel injection determined by the arithmetic circuit 2 becomes 3.5 ml. Then, on the next fuel injection pulse, the totalled value becomes 3.7 ml. On the next clock pulse, this totalled value is detected by the decision circuit 13 to be greater than the first predetermined value, and therefore an output pulse 13a (as may be seen in FIG. 4(c)) and a subtraction command pulse 13b are output by the decision circuit 13. The new totalled amount in the circuit 12 is now 2.7 ml. However, on the next clock pulse, this is determined by the decision circuit 13 to be still greater than the first predetermined value, and therefore again an output pulse 13a and a subtraction command pulse 13b are output by the decision circuit 13. Subtraction of the second predetermined value 1.0 from the totalled amount in the circuit 12, however, still leaves the value thereof at 1.7, which is still greater than the first predetermined value 1.0. Therefore on the next clock pulse the decision circuit yet again issues pulses 13b and 13a, and this time the new value of the totalled value is 0.7, which is less than the first predetermined value. Therefore production of pulses by the decision circuit 13 is terminated.

Thus, the decision circuit 13 outputs pulse signals in synchronization to the clock pulses until the totalled value is below the first predetermined value. Accordingly, the signal processing circuit 10 receives a number of pulse signals 13a, each corresponding to a constant amount of fuel injected, i.e., fuel consumed, at regular intervals. This makes possible easy calculation of various kinds of fuel consumption data at high accuracy, as explained above.

Although the present invention has been shown and described with respect to two preferred embodiments thereof, it should be understood that various changes of the form and the content of any particular embodiment may be made by one skilled in the art, without departing from the scope of the invention, which should therefore be determined, not by any purely fortuitous details of the shown embodiments, or of the drawings, but solely by the accompanying claims.

What is claimed is:

1. In an electronic fuel injection control system for an internal combustion engine for controlling the ratio of an energized period and a deenergized period of an actuator which operates to open and close a fuel injection valve in response to a fuel injection pulse, which system includes a first means for determining a fuel injection amount based on intake air flow rate and other control parameters and generating a first signal having a signal value indicative of the determined fuel injection amount, a second means for correcting the value of said first signal fed from said first means and generating the fuel injection pulse having a pulse width corresponding to the corrected fuel injection amount and indicative of the ratio of an energized period and a deenergized period of the actuator of the fuel injection valve based on the corrected signal value, a fuel consumption measuring apparatus comprising in combination:

a third means for receiving said first signal and adding the signal value of said first signal in synchronism with said fuel injection pulse, said third means comparing a sum of said signal value with a predetermined value and generating a counting pulse signal when said sum becomes equal to or more than the predetermined value;

a fourth means for counting up said counting pulse signal, said fourth means generating a second signal indicative of consumed fuel amount, and said fourth means further generating a command signal to be fed to said third means and operate the third means for subtracting said predetermined value from the sum of the signal value; and a fifth means for receiving said second signal from said fourth means and calculating consumed fuel amount based on the counted up counting pulse signal, and displaying consumed fuel amount based on said second signal value.

2. An apparatus as set forth in claim 1, wherein said fourth means generates said command signal repeatedly until the sum of said first signal value becomes less than the predetermined value.

3. An apparatus as set forth in claim 1 or 2, wherein said second signal generated by said fourth means is a pulse signal having a frequency proportional to the fuel consumption amount and said fifth means includes a digital display means.

4. In an electronic fuel injection control system for an internal combustion engine for controlling the ratio of an energized period and a deenergized period of an actuator which operates to open and close a fuel injection valve in response to a fuel injection pulse, which system includes a first means for determining a fuel injection amount based on intake air flow rate and other control parameters and generating a first signal having a signal value indicative of the determined fuel injection amount, a second means for correcting the value of said first signal fed from said first means and generating the fuel injection pulse having a pulse width corresponding to the corrected fuel injection amount and indicative of the ratio of an energized period and a deenergized period of the actuator of the fuel injection valve based on the corrected signal value, a method for measuring of fuel consumption comprising in combination the steps of:

totalling signal value of said first signal;

comparing a sum of said first signal value with a predetermined value and generating a counting pulse when the sum is equal to or more than said predetermined value;

subtracting said predetermined value from said sum of first signal value in response to a generation of said counting pulse;

counting said counting pulse and determining fuel consumption amount based on the counted pulse numbers and generating a pulse signal having a frequency proportional to the determined fuel consumption amount; and displaying the determined fuel consumption amount based on said pulse signal.

5. A method as set forth in claim 4, wherein the step of totalling said first signal value is carried out in synchronism with said fuel injection pulse.

* * * * *